March 19, 1935.  A. F. McCLAIN, SR  1,995,214
ANIMAL STARTING TRAP
Filed March 3, 1932  3 Sheets-Sheet 2
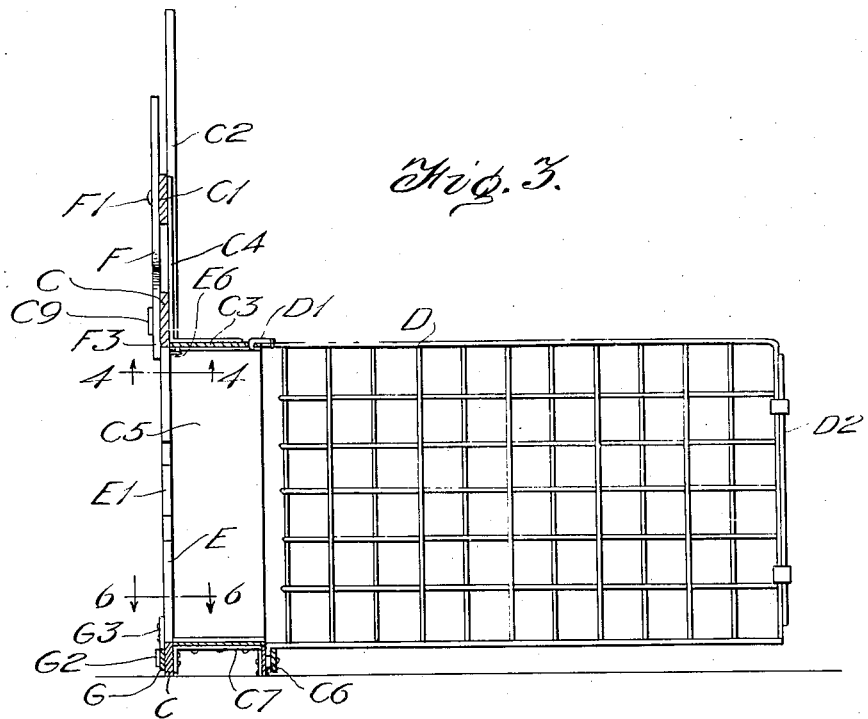
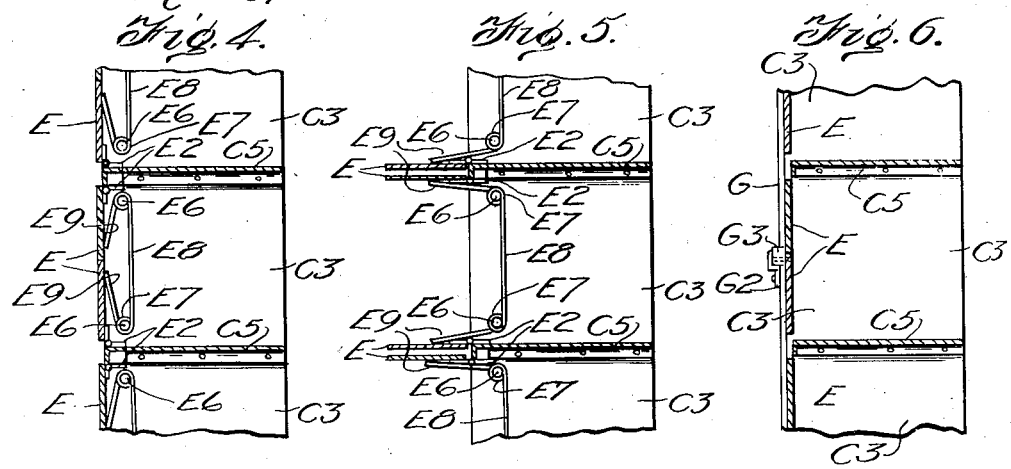

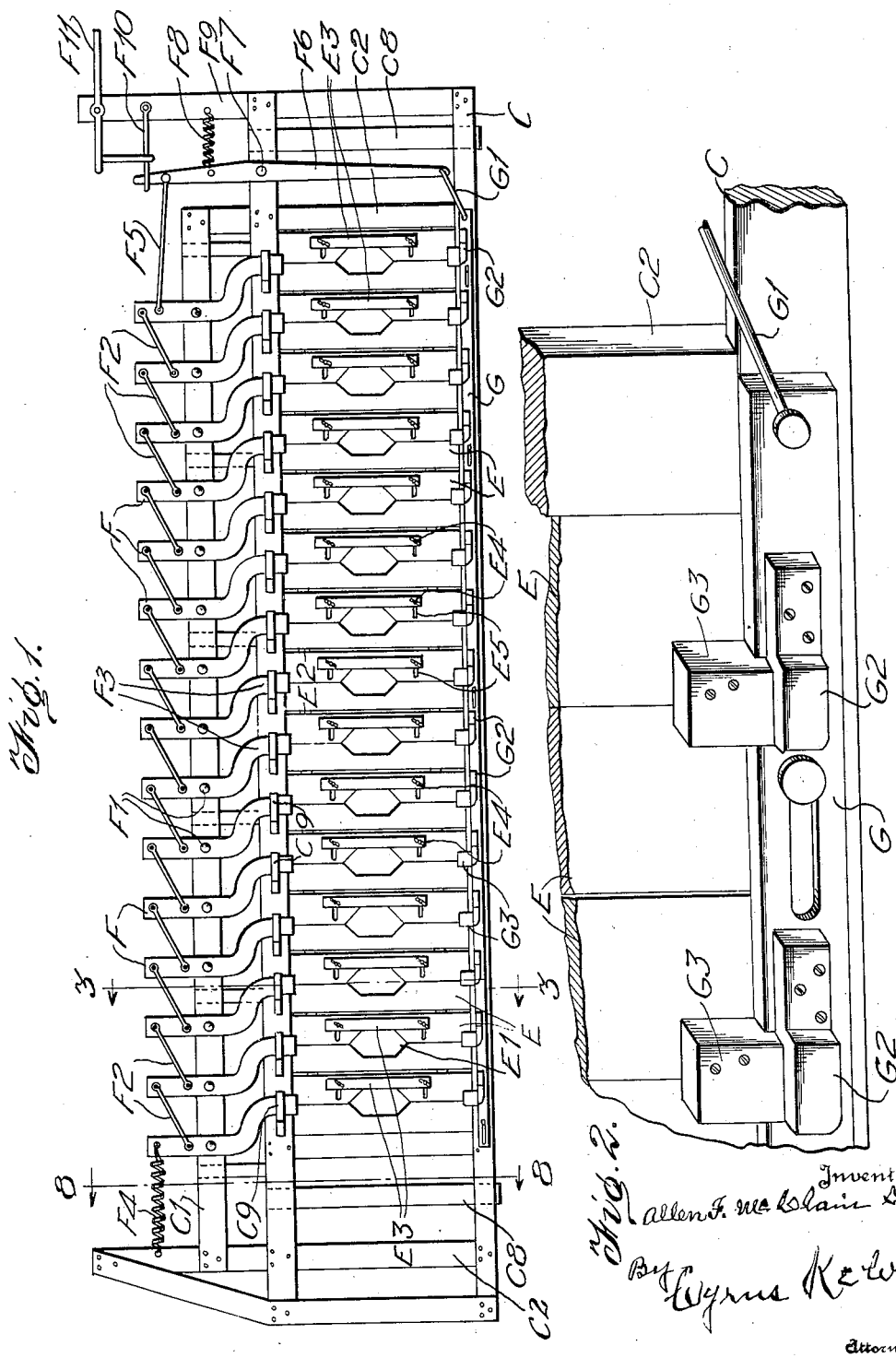

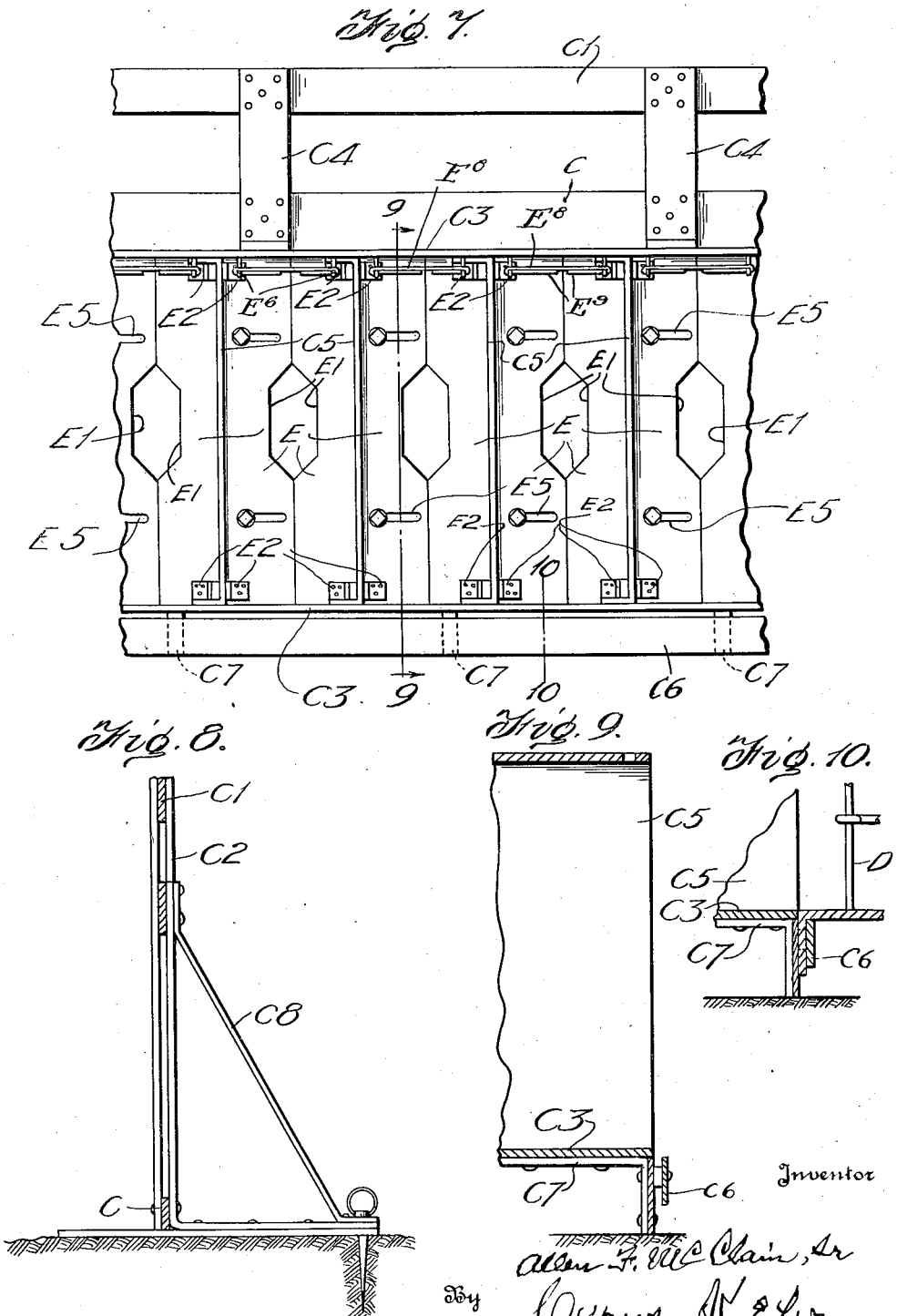

Patented Mar. 19, 1935

1,995,214

UNITED STATES PATENT OFFICE 1,995,214

ANIMAL STARTING TRAP

Allen F. McClain, Sr., Knoxville, Tenn.

Application March 3, 1932, Serial No. 596,638

7 Claims. (Cl. 119—15.5)

This invention relates to an improvement in animal starting traps, and is a continuation in part of my application on Race tracks, Serial No. 579,774, filed December 8, 1931, now Patent No. 1,877,471, granted September 13, 1932.

The purpose of my present invention is to provide a starting trap of an improved character for inclosing chasing animals, such as dogs or the like, for a race track and which will release all of the animals at the same time. Provision is made for properly controlling the doors of the trap in order to securely restrain the animals, but to permit their simultaneous release when desired.

In the accompanying drawings:

Fig. 1 is a front elevation of my improved starting trap;

Fig. 2 is an enlarged detail perspective view of one of the controls for the doors;

Fig. 3 is a sectional view taken generally on the line 3—3 of Fig. 1 parts being omitted and the cage shown in side elevation, for the sake of clearness;

Fig. 4 is a detail horizontal sectional view on the line 4—4 of Fig. 3 showing the doors closed;

Fig. 5 is a similar view showing the doors open;

Fig. 6 is a horizontal sectional view on the line 6—6 of Fig. 3;

Fig. 7 is a rear elevation of the casing structure of a portion of the trap;

Fig. 8 is a vertical sectional view on the line 8—8 of Fig. 1 with the upper parts of the upright members and the tension spring omitted;

Fig. 9 is a partial vertical sectional view on the line 9—9 of Fig. 7; and

Fig. 10 is a detail sectional view on the line 10—10 of Fig. 7 showing the attaching of the cage to the trap.

The trap is shown as constructed with a frame C which has a horizontal bar C1 connected across the top thereof between upright members C2. The frame C has a casing C3 at the back thereof held rigid by braces C4, and is divided off into a plurality of doorways by partitions C5, in each of which doorways a racing animal such as a dog is adapted to be disposed, being inclosed by a wire cage D, the upper side of which is detachably hooked to the back of the casing C by latches D1 and the lower side is hooked over a bar C6, and which cage has a door D2 at the back end thereof through which the dogs may be placed in the cage and held therein as shown in Fig. 3. Braces C7 extend between the bar C6 and the frame C under the casing C3, and braces C8 are provided to hold the frame upright and to be secured to a foundation, as shown in Fig. 8.

For each cage, a pair of doors E is provided which have registering notches E1 in adjacent edges thereof to form an opening for receiving the head of the dog, the doors being hinged at their outer edges as at E2 and swinging together at the center of each cage with the notches E1 in registry.

The opening formed by the notches E1 of co-operating doors may be adjusted in size by a plate E3 having bolts E4 connected with opposite ends thereof and extending into slots E5 in one of the doors to increase or decrease the width of the opening.

Extending downwardly from the casing C3 on opposite sides of each of the cages are pins E6 receiving the eyes E7 of a spring E8, as shown in Figs. 4 and 5. The ends of the springs are designated E9 and bear against the doors E normally tending to force them outward to the positions shown in Fig. 5.

In order to hold the doors in closed positions a series of latches F are individually pivoted as at F1 to the bar C1 of the frame and are connected together by links F2 for simultaneous movement. The long ends of the levers F are turned downward as at F3 to engage over the edges of the doors to restrain them against opening. Keepers C9 are provided to receive the downturned ends F3 and hold the doors closed.

At one end of the series of latches F, a tension spring F4 is connected while the opposite end of the series of levers has a link F5 attached thereto extending to a lever F6 pivoted as at F7, and having a spring F8 attached thereto of less resiliency than the spring F4 to slightly check the action thereof after opening of the doors.

An upright member F9 is connected with the frame C and carries a loop member F10 pivoted thereto and disposed in position to loop over the upper end of the lever F6 which is the main control lever for the doors and which loop F10 is adapted to be lifted by means of a rock arm F11.

A bar G is disposed at the lower side of the frame C and attached thereto for longitudinal sliding movement, being reciprocated by a link G1 connecting the same with the main control lever F6. The bar G carries a series of brackets G2 arranged in position to be engaged over blocks G3 attached to individual ones of the series of doors and to engage over the fronts of the companion doors so as to cause the doors to be held in closed positions and assisting the levers F for this purpose. It will be noted that the end F3 of the lever F engages both doors of each pair while the block G3 engaged by the bracket G2 is connected with one door of the pair and engages the other to thus securely hold both doors of each pair in closed positions until released.

To release the doors it is only necessary for the starter to bear down on the outer end of the rock arm F11 which raises the loop member F10 from the upper end of the main lever F6 which allows the spring F4 to pull the series of bars to the left in Fig. 3 and raise the ends F3 out of engagement with the doors.

At the same time this causes movement of the bar G in the opposite direction to release the brackets G2 from the blocks G3 which thus releases both of the doors of the series. The spring arms E9 normally tend to cause the opening of the doors and when they are released these spring arms swing them outward to the positions shown in Fig. 5. Since all of the doors are released simultaneously they will be simultaneously thrown open permitting the dogs to get an even start around the track.

I claim:

1. A starting trap comprising a plurality of cages, one or more doors for closing an end of each cage, means normally tending to force the doors open, a series of levers having operative connection with the doors for holding the same closed, pivotal supports for the levers, and means connecting the levers together for simultaneous operation, resilient means normally tending to force the levers in one direction, a main control lever connected with the levers holding the same in set positions, and releasing means for the main control lever.

2. A starting trap comprising a plurality of cages, one or more doors for closing an end of each cage, means normally tending to force the doors open, a series of levers having operative connection with the doors for holding the same closed, pivotal supports for the levers, and means connecting the levers together for simultaneous operation, resilient means normally tending to force the levers in one direction, a main control lever connected with the levers holding the same in set positions, releasing means for the main control lever, and a longitudinally sliding bar connected with the main control lever and having operative connections with the doors for holding the same closed.

3. A starting trap comprising a frame, a casing connected with the frame, vertical partitions dividing the casing into a plurality of doorways, a pair of oppositely swinging doors for closing each doorway, means for releasing the doors and causing an outward swinging movement thereof and a cage extending rearwardly from and connected with the casing.

4. A starting trap comprising a casing divided into one or more doorways, a door for each doorway, a cage extending rearwardly from the casing, means for latching the upper side of the cage to the casing, a horizontally extending bar connected with the casing and having a slot extending therealong to receive a portion of the cage to connect the cage with the casing.

5. A starting trap comprising a casing having a plurality of upright partitions therein, a cage extending rearwardly from the casing, a bar extending lengthwise of the casing and spaced therefrom to receive a portion of the lower edge of the cage, and a latch for connecting the upper edge of the cage with the casing.

6. A starting trap comprising a casing having a plurality of upright partitions therein, a cage extending rearwardly from the casing, a bar extending lengthwise of the casing and spaced therefrom to receive a portion of the lower edge of the cage, a latch for connecting the upper edge of the cage with the casing, an upright frame connected with the casing, and supporting braces connected with opposite end portions of the frame.

7. A starting trap comprising a plurality of compartments, a pair of hinged doors for each compartment, a projection carried by one door of each compartment and arranged to overlap the adjacent edge of the other door thereof, a sliding bar having means to interlock with the projections of the plurality of compartments and hold the doors closed, guiding means for said sliding bar, and actuating means for said bar causing simultaneous release of the doors.

ALLEN F. McCLAIN, Sr.